United States Patent
Sesek

(10) Patent No.: US 7,151,611 B2
(45) Date of Patent: Dec. 19, 2006

(54) METHOD AND SYSTEM FOR REVERTING TO DEFAULT PRINTER PROPERTIES AFTER A SPECIFIED TIME INTERVAL

(75) Inventor: Robert Sesek, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 821 days.

(21) Appl. No.: 10/196,667

(22) Filed: Jul. 15, 2002

(65) Prior Publication Data

US 2004/0008362 A1    Jan. 15, 2004

(51) Int. Cl.
*G06F 15/00*    (2006.01)
*G06K 1/00*    (2006.01)

(52) U.S. Cl. ............ 358/1.13; 358/1.14; 358/1.15; 700/19; 718/100

(58) Field of Classification Search ............ 347/37, 347/5; 358/1.13, 1.15, 1.16, 1.14; 399/81; 707/10; 718/100; 700/19
See application file for complete search history.

(56) References Cited

U.S. PATENT DOCUMENTS

| | | | |
|---|---|---|---|
| 6,015,204 A * | 1/2000 | Ha | 347/37 |
| 6,219,153 B1 * | 4/2001 | Kawanabe et al. | 358/1.16 |
| 6,364,442 B1 * | 4/2002 | Kawase et al. | 347/5 |
| 6,466,935 B1 * | 10/2002 | Stuart | 707/10 |
| 6,486,968 B1 * | 11/2002 | Nishikawa | 358/1.15 |
| 6,782,218 B1 * | 8/2004 | Sekiguchi et al. | 399/81 |
| 6,981,254 B1 * | 12/2005 | Parry | 718/100 |
| 7,016,740 B1 * | 3/2006 | Nakamura et al. | 700/19 |
| 2002/0041386 A1 * | 4/2002 | Suzuki et al. | 358/1.13 |

FOREIGN PATENT DOCUMENTS

| | | | |
|---|---|---|---|
| JP | 2121860 | | 5/1990 |
| JP | 05298042 A | * | 11/1993 |
| JP | 2004038985 A | * | 2/2004 |
| JP | 2004086282 A | * | 3/2004 |
| JP | 2005062402 A | * | 3/2005 |

* cited by examiner

*Primary Examiner*—Kimberly Williams
*Assistant Examiner*—Satwant Singh

(57) ABSTRACT

In data processing system, print jobs are printed on a selected printer utilizing the printer properties in effect for that printer at the time that the print job was spooled for printing. Typically, the printer prints with default printer properties. However, a user can temporarily override these defaults values by specifying temporary printer properties from within an application. A user-specifiable printer properties retention timer value allows the user to control how long temporary printer properties are to be in effect before being set back to their default value.

13 Claims, 3 Drawing Sheets

METHOD AND SYSTEM FOR REVERTING TO DEFAULT PRINTER PROPERTIES AFTER A SPECIFIED TIME INTERVAL

FIELD OF THE INVENTION

The present invention generally relates to printer interfaces and, more specifically, to a Graphical User Interface (GUI) printer interface that provides the ability to control how long to utilize temporary printer properties before reverting to default values.

BACKGROUND OF THE INVENTION

Printing in a typical computer system is typically controlled by the operating system. When using a Graphical User Interface (GUI) operating system, currently such as Windows® from Microsoft Corporation or Macintosh® from Apple Computer, Inc., a user will select printing, typically either through a menu option or by depressing a button on a button bar. A printer driver will then format the requested printing for the selected printer and queue the printing in a print spool for printing. The printer driver will then download the printer commands that will result in printed pages to the selected printer. The printing is done in conformity with the printer properties in effect for the printer at the time the printing is commanded.

Printer drivers are typically supplied to computer users either by the printer vendor or by the operating system vendor. Since the sophistication of a printer driver user interface can help sell printers, printer vendors have produced evermore sophisticated printer drivers and printer driver interfaces. Some of the features or printer properties currently available in printer drivers and printer driver interfaces include: printing a single page of a document, the entire document, or a range of pages in the document; printing multiple copies of a document; printing the pages in a document in reverse order; printing multiple pages of a document on a single page of paper; landscape and portrait printing; printing utilizing paper from particular trays; printing on different page sizes; printing labels; duplex printing where both sides of a page are printed; and printing with watermarks. In the Windows operating systems from Microsoft, printing is done utilizing printer properties. If temporary printer properties are supplied with the print job, they are utilized. Otherwise, the default printer properties of a printer are utilized.

Currently, in such an environment, default printer properties are set or modified in a process that starts by opening a system Printers file folder. Within the system Printers file folder, a printer is selected and activated, typically by double clicking on an icon for the selected printer. A Printer menu is then launched and displayed for that printer that shows, among other things, the current queue or spool for the printer. From the File pull-down Properties menu for the Printer menu, a Printer Properties menu or set of menus is launched. The printer properties modifications made to the Printer Properties menu or set of menus become the default settings for this printer until changed. In the current Microsoft Windows environments, this currently requires that these printer properties changes or modification be written to the system Registry, where they are maintained as the default printer properties settings until changed.

Temporary printer properties are set in a similar manner from within application programs. In the Windows operating systems from Microsoft, these temporary printer properties are typically set either by selecting printing from the "File" menu or by selecting and activating a Print button in an application program. Either of these actions launches a "Print" menu. One of the options on the Print menu is the selection of which printer to use when more than one is available. Once the printer to utilize has been selected, a user can then also select and activate a "Properties" button. This typically will launch a printer or vendor-specific "Printer Properties" menu or set of menus corresponding to the selected printer. A Printer Properties menu is alternatively launched by selecting "Printer Properties" from the "File" pull-down menu of many applications. Printer properties for the selected printer can then be temporarily modified utilizing the associated Printer Properties menu or set of menus.

One of the problems that arises when changing printer properties from within application programs is that many, if not most, of these temporary printer properties automatically change back to their default values for the currently selected printer after an undefined period of time. This process of reverting printer properties back to default values for this printer appears to a user to be somewhat arbitrary. For example, many of these temporary printer properties are maintained by an application. Thus, as long as that application continues to execute, any print requests on the currently selected printer will utilize these temporary printer properties. On the other hand, the temporary printer properties can be lost when an application terminates. In some other instances, temporary printer properties only remain changed for a single print request, after which time they are reset to their default values.

One result of temporarily modified printer properties reverting to their default values at what appear to a user to be arbitrary times is that sometimes print requests are printed with inappropriate settings. For example, if a user prints transparencies from a transparency printer tray and then goes on to do something else; he may be surprised when a subsequent print request also prints on transparencies. Alternatively, the user may be trying to utilize duplex printing, only to find that subsequent print requests end up being printed on one side of a page because printer properties have been unexpectedly set back to their default values.

It would therefore be advantageous for a user of a Graphical User Interface operating system on a computer to be able to control the reversion of temporary printer properties back to their default values.

BRIEF SUMMARY OF THE INVENTION

In a computer system, print jobs are printed on a selected printer utilizing the printer properties in effect for that printer at the time that the print job was spooled for printing. Typically, the printer prints with default printer properties. However, users can temporarily override these values by specifying temporary printer properties from within applications. A user-specifiable printer properties retention timer value allows the user to control how long temporary printer properties are to be in effect before being set back to their default value.

In a computer system providing a Graphical User Interface, a Printer Properties menu or set of menus provides menu options allowing a user to enable timed printer property retention and to specify how long to retain temporary printer properties before being reset to default values. Alternatively, a submenu may also be launched to fine tune the timed retention of specific printer properties. The enablement of timed printer property retention, the printer properties retention timer value, and any corresponding fine tuning parameters are preferably treated as printer properties themselves, and are set to default and temporary values in a similar manner as is done with other printer properties.

DETAILED DESCRIPTION OF THE INVENTION

Figure 1:
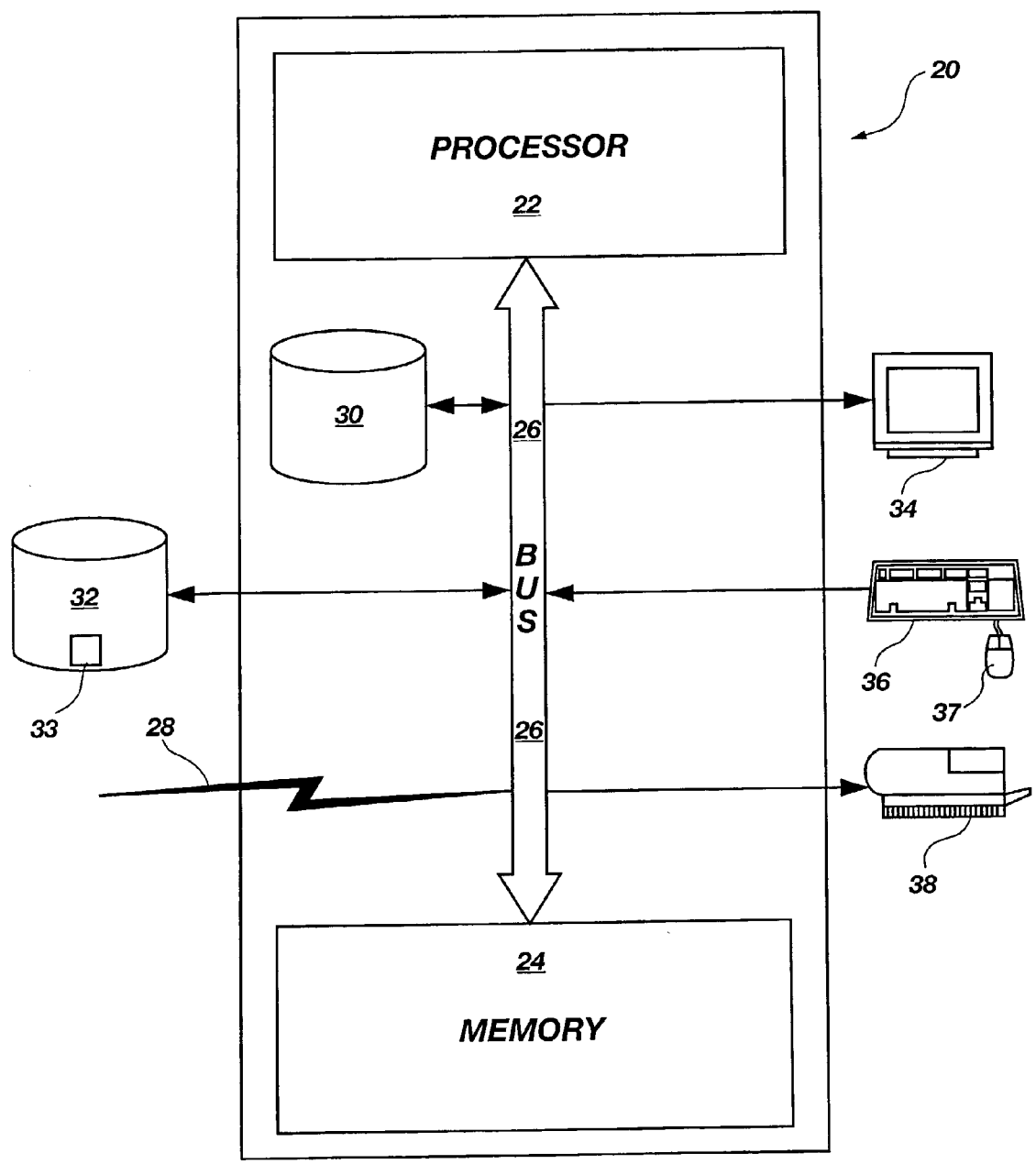
FIG. 1 is a block diagram illustrating an exemplary General Purpose Computer in a data processing system.

FIG. 1 is a block diagram illustrating an exemplary general purpose computer 20 in a data processing system. The general purpose computer 20 has a computer processor 22 and memory 24, connected by a bus 26. Memory 24 is a relatively high-speed, machine-readable medium and includes volatile memories, such as DRAM and SRAM, and non-volatile memories, such as ROM, FLASH, EPROM, and EEPROM. Also connected to the bus 26 are secondary storage 30, external storage 32, output devices such as a monitor 34, input devices such as a keyboard 36 (with mouse 37), and printers 38. Secondary storage 30 includes machine-readable media such as hard disk drives (or DASD) and disk subsystems. External storage 32 includes machine-readable media such as floppy disks, removable hard drives, magnetic tapes, CD-ROM, and even other computers, possibly connected via a communications line 28. The distinction drawn here between secondary storage 30 and external storage 32 is primarily for convenience in describing the invention. As such, it should be appreciated that there is substantial functional overlap between these elements. Computer software such as printer drivers, operating systems, and application programs can be stored in a computer software storage medium, such as memory 24, secondary storage 30, or external storage 32. Executable versions of computer software 33 can be read from a computer readable medium such as external storage 32, secondary storage 30, and non-volatile memory and loaded for execution directly into volatile memory, executed directly out of non-volatile memory, or stored on the secondary storage 30 prior to loading into volatile memory for execution.

Figure 2:
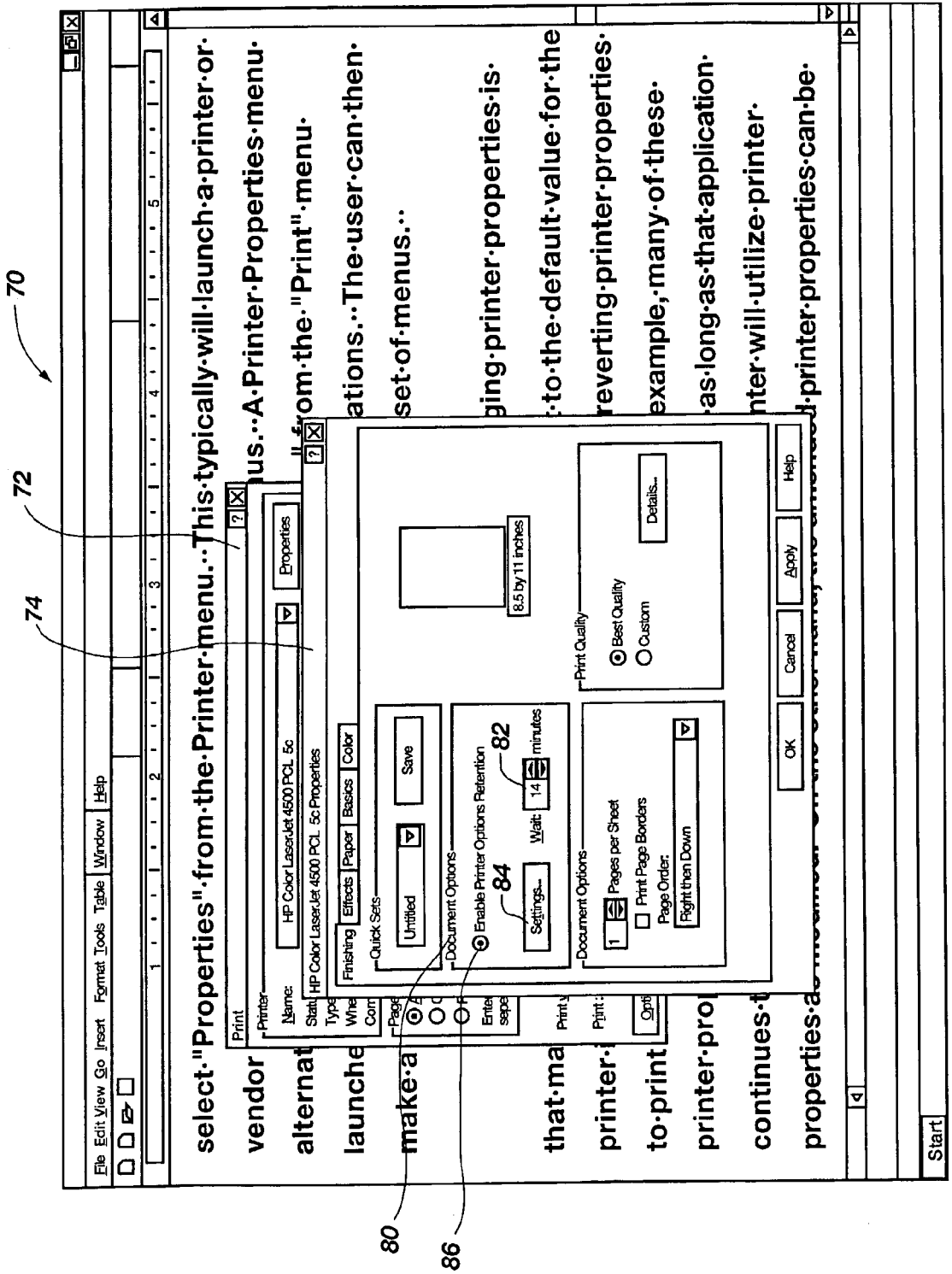
FIG. 2 is a diagram illustrating a Graphical User Interface screen on a computer monitor as shown in FIG. 1.

FIG. 2 is a diagram illustrating a Graphical User Interface screen 70 on a computer monitor 34 as shown in FIG. 1. The Graphical User Interface screen 70 in FIG. 2 shows a Print menu 72 that is typically launched either by selecting and activating a "Print" button or from a "Print" selection on a "File" pull-down menu from within an application. A Printer Properties menu 74 is then launched by selecting and activating a "Properties" button on the Print menu 72. The Printer Properties menu 74 has an additional "Printer Options Retention" 80 set of properties. The Printer Options Retention 80 set of properties includes a Printer Options Retention Enable 86 option button or check box for enabling Printer Options Retention titled "Enable Printer Options Retention." It also contains a Printer Properties Retention Time Selector 82 for specifying a printer properties retention timer value, which is how long to retain printer properties. The Printer Properties Retention Time Selector 82 is preferably a combination list-edit box that allows a user to either directly type in a numeric value or utilize a scroll bar to set the printer properties retention timer value. The Printer Options Retention 80 set of properties alternatively also contains a Printer Options Retention Properties Button 84 for launching a menu to more finely tailor the printer properties retention process, for example, by specifying which printer properties are to be subject to printer properties timed retention.

When a Graphical User Interface user modifies printer properties, he will typically launch a Printer Properties menu 74 from a Print menu 72 from within an application. The present invention allows the user to specify how long these temporary printer properties are to be in effect before the printer properties for the selected printer are reset back to their default values. In this embodiment, the user enables this capability by selecting or activating the Printer Options Retention Enable 86. The time that the modified printer properties will remain effective can then be set utilizing the Printer Properties Retention Time Selector 82.

In the preferred embodiment, enablement of Printer Properties Retention, the printer properties retention timer value, and, alternately, fine tuning of such are themselves printer properties. These printer properties thus preferably have their default values set in the Printer Properties menu or set of menus launched from a Printer menu launched from a Graphical User Interface desktop and their temporary values set in the Printer Properties menu or set of menus launched from within applications.

Figure 3:
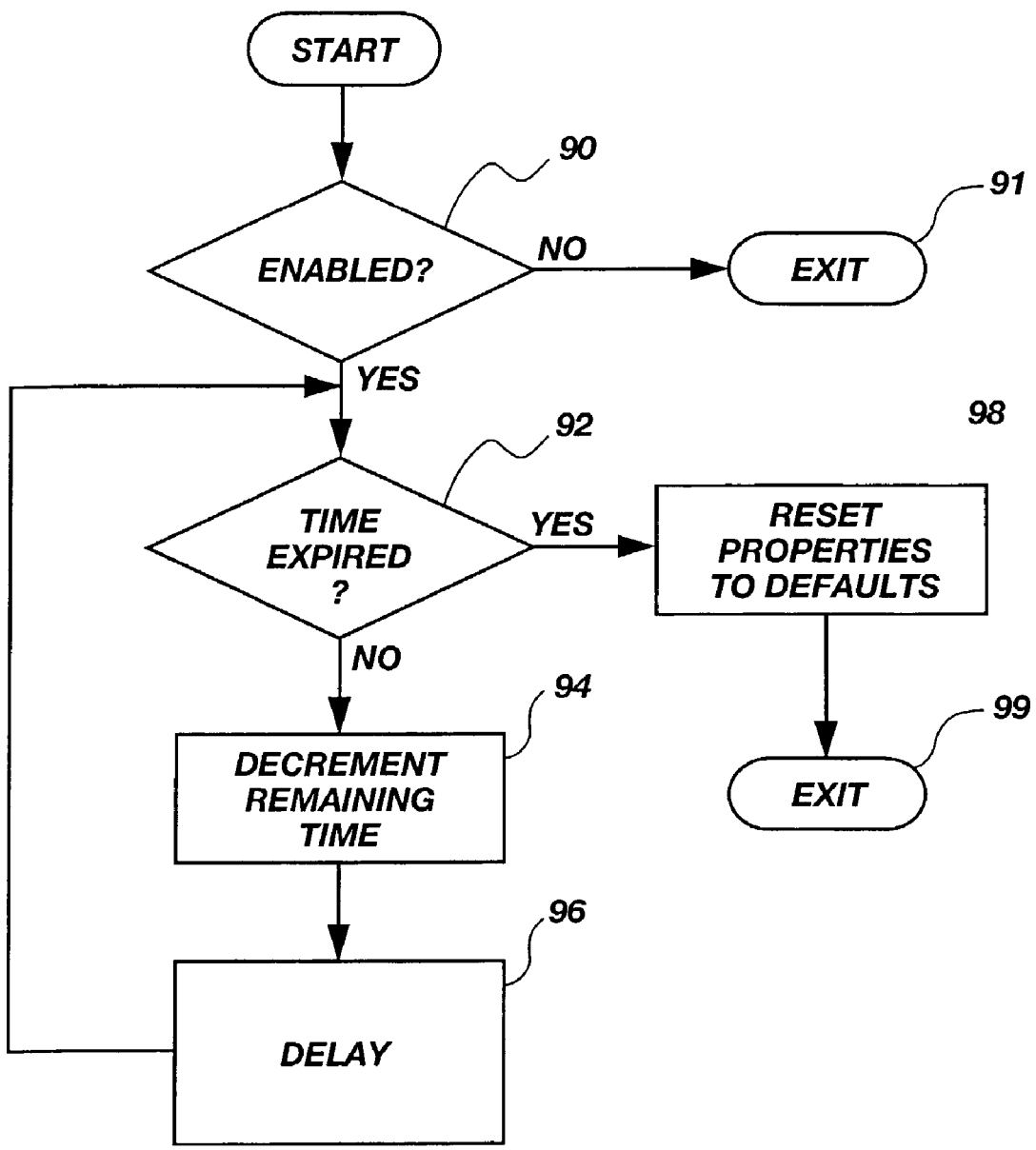
FIG. 3 is a flowchart illustrating an embodiment of the present invention.

FIG. 3 is a flowchart illustrating an embodiment of the present invention. When changes are made to the properties for a printer, a check is made whether Printer Properties Retention is enabled, step 90. In the embodiment shown in FIG. 2, printer properties timed retention is enabled by selecting or activating the Printer Options Retention Enable 86. Other methods of enabling printer properties timed retention are also within the scope of this invention, such as testing whether the Printer Properties Retention Time Selector 82 contains a non-zero value. If printer properties timed retention is not enabled, step 90, then the procedure is complete and exits, step 91.

However, if the printer properties timed retention is enabled, step 90, then a loop is entered. A test is made whether the printer properties retention timer value has elapsed, step 92. If the printer properties retention timer value has not elapsed, step 92, the remaining amount of time is decremented, step 94, and the procedure delays or waits a prescribed period of time, step 96. At the end of this delay or wait, step 96, the method repeats the loop, starting with a test whether the time has expired, step 92. However, when the printer properties retention timer value duration has expired, step 92, the printer properties are reset to their default values, step 98, and the procedure exits, step 99. This retention timer could be set to different values for different printer properties or could be applied to "quick sets" or groups or predefined multiple driver property combinations. These temporary driver properties could also be set based on number of print jobs instead of or in addition to a timer i.e., duplex the next ten print jobs, or after 30 minutes or next 10 print jobs.

The above is illustrative only. Other methods of implementing this invention are also within the scope of this invention. For example, in an alternate embodiment, some operating systems provide a mechanism to schedule events in the future. In such a system, instead of looping and waiting for the timer value to decrement to zero before resetting to default values, the resetting to default values can be scheduled as an event at the appropriate time in the future.

An apparatus and method for specifying when to reset printer properties to their default values has been disclosed. This provides a mechanism for a computer user to improve the certainty as to when these properties are automatically reset to default values, and thus reduces the frequency at which a computer user prints to a printer with unexpected printer properties.

Those skilled in the art will recognize that modifications and variations can be made without departing from the spirit of the invention. Therefore, it is intended that this invention encompass all such variations and modifications as fall within the scope of the appended claims.

What is claimed is:

1. A method of controlling printer properties, the method comprising:
   waiting a specified period of time; and
   resetting a set of printer driver-type properties from a temporary set of printer driver-type properties to a default set of printer driver-type properties at an end of the specified period of time, wherein the specified period of time comprises a time value that is a preselected non-zero numeric value quantifiable in minutes.

2. The method according to claim 1 which further comprises:
   enabling the waiting.

3. The method according to claim 2 wherein the step of enabling comprises:
   enabling a printer properties retention time selector with the preselected non-zero numeric value.

4. The method according to claim 1 which further comprises:
   specifying which of the set of printer driver-type properties are to be reset to their corresponding values.

5. The method of claim 1 wherein the preselected non-zero numeric value is based on a selected time in the future.

6. A system providing for controlling printer properties, the system comprising:
   a processor;
   a printer properties retention timer;
   a graphic user interface comprising:
      a set of selectable printer properties; and
      a printer properties retention time selector for specifying a time value to be applied to the printer properties retention timer, the time value comprising a preselected non-zero numeric value quantifiable in minutes; and
   a computer readable software storage medium containing software comprising a set of computer instructions configured to cause the processor to wait a specified period of time as determined by the numeric value in the printer properties retention timer, and to reset a temporary set of printer properties selected via the graphic user interface to a default set of printer properties at an end of the specified period of time.

7. The system in claim 6 wherein the software further comprises:
   a set of computer readable instructions for enabling the waiting.

8. The system of claim 6 wherein the preselected non-zero numeric value is based on a selected time in the future.

9. A computer readable medium having computer readable instructions thereon for:
   waiting a specified period of time; and
   resetting a set of printer driver-type properties from a temporary set of printer driver-type properties to a default set of printer driver-type properties at an end of the specified period of time, wherein the specified period of time comprises a time value that is a preselected non-zero numeric value quantifiable in minutes.

10. The computer readable medium in claim 9 further having thereon:
    a set of computer readable instructions for enabling the waiting.

11. The computer readable medium in claim 10 wherein the computer readable instructions for enabling comprise:
    a set of computer readable instructions for enabling a printer properties retention time selector.

12. The computer readable medium in claim 9 further having thereon:
    a set of computer readable instructions for specifying which of the set of user selectable printer properties are to be reset to their corresponding values.

13. The computer readable medium of claim 9 wherein the preselected non-zero numeric value is based on a selected time in the future.

* * * * *